Sept. 19, 1967  L. S. SMITH  3,343,057
BOOSTER SUPPLY SERVICE VEHICLES WITH POLARITY PROTECTION
Filed Feb. 15, 1965
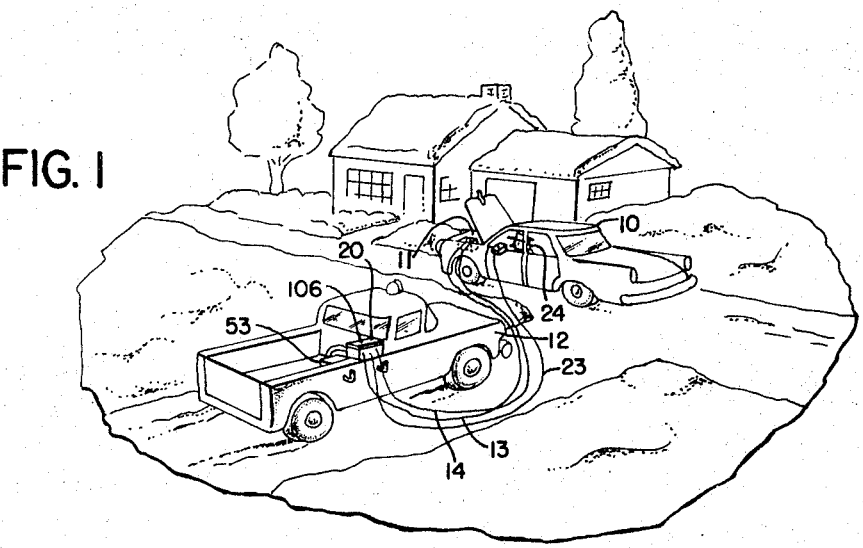
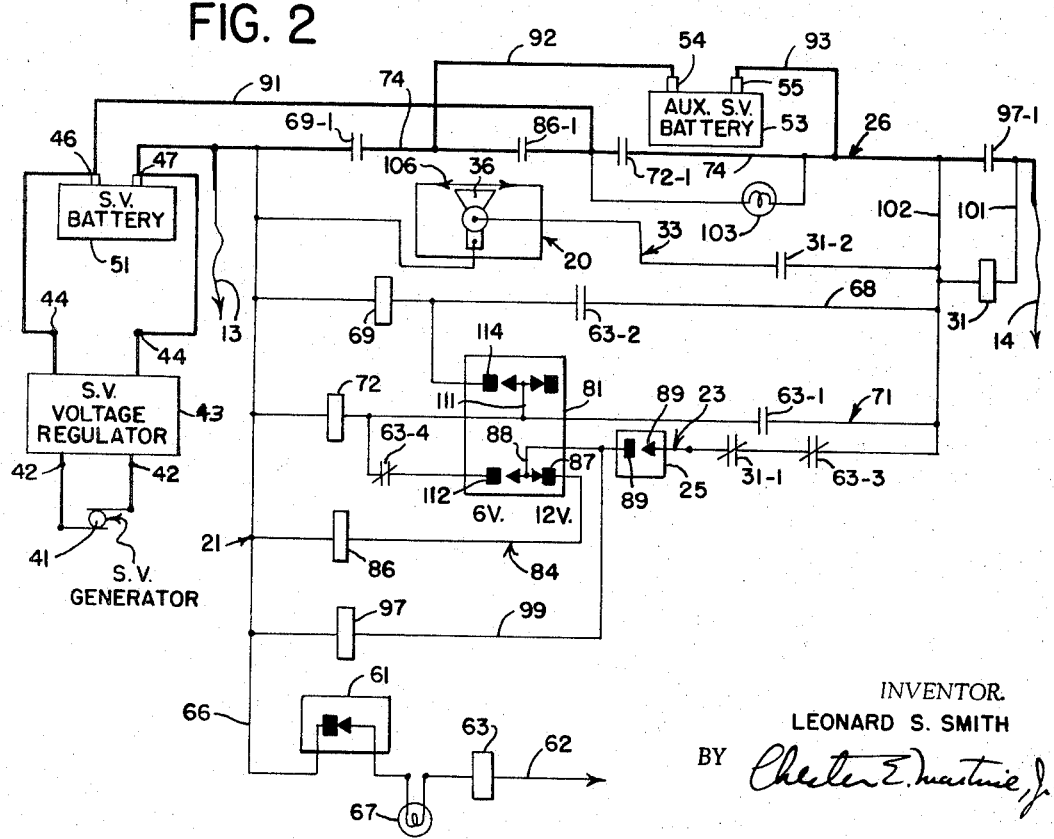
INVENTOR.
LEONARD S. SMITH
BY
ATTORNEY

United States Patent Office 3,343,057
Patented Sept. 19, 1967

3,343,057
BOOSTER SUPPLY SERVICE VEHICLES
WITH POLARITY PROTECTION
Leonard S. Smith, Minneapolis, Minn., assignor to Litton
Precision Products, Inc., Minneapolis, Minn.
Filed Feb. 15, 1965, Ser. No. 432,558
7 Claims. (Cl. 320—6)

ABSTRACT OF THE DISCLOSURE

A battery boosting apparatus used with a service vehicle for applying boost voltage to run-down automotive storage batteries for starting purposes. Boost power is supplied by a combination of the service vehicle battery and an auxiliary battery, both of which are re-charged by the service vehicle charging system, and reverse-polarity protection is provided which sounds an alarm and prevents application of boost voltage if the apparatus is connected in reverse polarity to a run-down battery.

This invention relates to service vehicles and more particularly to battery-operated, booster current supply apparatus maintained in a charged condition by a service vehicle electrical system.

Automotive engines often become difficult to start and may require extensive cranking which runs down the battery of the electrical system of the automobile. To start the engine, it is often necessary to call a service vehicle which is adapted to supply booster current for the run-down battery.

In many instances, it is difficult or extremely time consuming to determine the polarity of the terminals of the run-down battery. Moreover, under conditions of darkness and extreme cold, which conditions usually exist when automobile batteries tend to become run-down, the problems attendant making such determinations of polarity are increased.

If the jumper cables are connected in reverse polarity, i.e., positive to negative and negative to positive, the current from the run-down battery is added to the booster current and may result in damage to an alternator-equipped stalled automobile. Also, because of said reverse polarity connection, the run-down battery will not be boosted by the service vehicle booster current. Further, the service vehicle operator does not known whether the electrical system of stalled automobile is faulty or whether the reverse polarity connection exists. Thus, the operator must check out the electrical system and the jumper cable connections and may spend a considerable amount of time merely because he is not aware of the reverse polarity connection.

Moreover, in an endeavor to quickly determine the cause of the failure to boost the run-down battery, the operator may forget to turn off the booster current supply, which permits the combined run-down battery and the booster currents to cause severe damage to an alternator-equipped electrical system.

An object of the present invention is to provide a new and improved service vehicle.

Another object of the present invention resides in the provision of an audible signal on a service vehicle in conjunction with facilities for operating the signal when a reverse polarity connection exists during a run-down battery boosting operation.

A further object of the present invention is to provide a booster current supply for a service vehicle wherein an electrical system of the service vehicle maintains the booster current supply in a charged condition.

Still another object of the present invention is to provide facilities rendered effective upon the connection of a booster current supply circuit in reverse polarity to a run-down battery for opening the booster current supply circuit and at the same time operating an audible signal which may be heard by an operator seated in a stalled automobile.

With these and other objects in view, the present invention contemplates a service vehicle provided with a service vehicle battery and an auxiliary battery for supplying booster current to a run-down battery of a stalled automobile. Switching facilities are provided for selectively connecting the service vehicle battery and the auxiliary battery in parallel to an electrical system of the service vehicle to maintain the service vehicle battery and the auxiliary battery charged. The switching facilities also connect the service vehicle battery and the auxiliary battery in series or parallel to provide a supply of booster current to a pair of jumper cables which may be connected to the terminals of a run-down battery of 12 to 6 volts respectively. Remote controls which may be operated by an operator seated within the stalled automobile are provided for completing a booster current supply circuit to the jumper cables. Polarity responsive facilities are rendered effective by a reverse polarity connection of the jumper cables to the terminals of the run-down battery for opening the booster current supply circuit and also for operating an audible signal which apprises the operator seated within the stalled vehicle of the reverse polarity condition.

A complete understanding of this invention may be had by reference to the following detailed description when read in conjunction with the accompanying drawings illustrating a preferred embodiment thereof, wherein:

FIG. 1 illustrates a service vehicle of the present invention having an audible signal operated upon connection of a booster current circuit in reverse polarity of the terminals of a run-down battery of a stalled vehicle, and FIG. 2 is a schematic diagram of circuitry for providing the booster current and operating the audible signal.

Referring now to the drawings, in FIG. 1 there is shown a stalled automobile 10 having a run-down battery 11, which has insufficient power to crank the engine of the stalled automobile 10. A service vehicle 12 is provided with booster or jumper cables 13 and 14, which may be connected to the run-down battery 11 to supply booster current to the run-down battery. The jumper cables 13 and 14 extend into a control cabinet 20 secured to the exterior of the service vehicle 12. A control circuit 21 (shown in FIG. 2) within the cabinet 20 may be remotely operated by a service vehicle operator 24 seated within the stalled automobile 10 upon actuation of a remote control switch 25. The remote control switch 25 is connected by a remote control cable 23 to the control circuit 21 within the control cabinet 20. Upon closure of the remote control switch 25, a booster current supply circuit 26 shown in FIG. 2 is completed for providing booster current through the jumper cables 13 and 14 to the run-down battery 11. If the jumper cables 13 and 14 are connected in proper polarity to the terminals of the run-down battery 11, the booster current from the booster current supply circuit 26 is sufficient to crank the engine of the stalled automobile 10.

However, if the jumper cables 13 and 14 are connected in reverse polarity to the terminals of the run-down battery 11, a polarity responsive relay 31 (shown in FIG. 2) within the control cabinet 20 is energized and opens the booster current supply circuit 26 so that the booster current is not applied to the jumper cables 13 and 14, and hence, not to the terminals of the run-down battery 11. Also the polarity responsive relay 31 completes an alarm circuit 33 (shown in FIG. 2) for energizing an audible alarm or signaling device 36, such as a buzzer, that is sufficiently loud to apprise the operator 24, who may be seated in the stalled vehicle 10, of the reverse polarity condition. The operator need then only reverse the connection of the jumper cables 13 and 14 and again operate the remote control switch 25, at which time the booster current will be properly supplied to the run-down battery 11 to quickly start the engine of the stalled automobile 10.

Referring now to FIG. 2, there is shown a generator 41 of the service vehicle 12 connected to terminals 42—42 of a voltage regulator 43 of the service vehicle. Terminals 44—44 of the service vehicle voltage regulator 43 are connected to opposite polarity terminals 46 and 47 of a service vehicle battery 51. In addition an auxiliary service vehicle battery 53 is mounted on the service vehicle 12 as shown in FIG. 1. The service vehicle battery 51 and the auxiliary battery 53 may be standard automobile batteries of the 12 volt type, for example.

In the normal operation of the service vehicle 12, such as when the service vehicle is being driven to the stalled automobile 10, a boost-charge switch 61 provided in the control circuit 21 is closed to connect the batteries 51 and 53 in parallel across the voltage regulator 43. More particularly, and referring to FIG. 2, upon closure of the boost-charge switch 61, a boost-charge selector circuit 62 is completed. The circuit 62 may be traced from a conductor 66, through the now closed boost-charge switch 61, through a boost-charge lamp 67, and through an ignition relay 63 to an ignition coil (not shown) of the service vehicle 12. Upon energization, the ignition relay 63 draws up a normally open contact 63–2 to complete a circuit 68 through a first parallel circuit relay 69. Upon energization, the first parallel circuit relay 69 draws up a normally open contact 69–1. Also, upon energization of the ignition relay 63, a normally open contact 63–1 is drawn up to complete a circuit 71 through a second parallel circuit relay 72 which draws up a normally open contact 72–1.

The closed contacts 69–1 and 72–1 complete a parallel battery circuit 74. It may be understood that closure of the contact 69–1 completes a circuit from the terminal 47 of the battery 51 to a terminal 54 of the auxiliary battery 53. Also, closure of the contact 72–1 completes a circuit from the terminal 46 of the battery 51 to a terminal 55 of the auxiliary battery 53 so that the parallel battery circuit 74 is completed and the batteries 51 and 53 are connected in parallel across the terminals 44—44 of the voltage regulator 43. In this manner the batteries 51 and 53 are charged and are maintained in condition for providing booster current while the service vehicle 12 is being driven to the stalled automobile 10.

Upon arrival at the stalled automobile 10, the service vehicle operator 24 (FIG. 1) adjusts the boost-charge switch 61 to the boost position to open the circuit 62 so that the ignition relay 63 is de-energized and releases the normally open contacts 63–1 and 63–2. The operator 24 then notes whether the run-down battery 11 of the stalled automobile 10 is a 6 volt or a 12 volt battery and adjusts the position of a double pole, double throw, battery voltage selector switch 81 to either a 6 volt or a 12 volt position to condition the control circuit 21 for boosting the run-down battery 11. (The 12 volt position in shown in FIG. 2.) The operator 24 then determines the polarity of the terminals of the run-down battery 11 and connects the jumper cables 13 and 14 to the terminals of the run-down battery in a given polarity, i.e., positive to positive, negative to negative.

Upon de-energization of the ignition relay 63, normally closed contacts 63–3 and 63–4 of the relay 63 are released and close. The contact 63–3 conditions a series control circuit 84 for operation. The series control circuit 84 includes a first series circuit relay 86 connected through a contact 87 and an armature 88 of the battery voltage selector switch 81, through normally open contacts 89—89 of the remote control switch 25, through a normally closed contact 31–1 of the polarity responsive relay 31 and through the normally closed contact 63–3. When the operator closes the remote switch 25, the series control circuit 84 is completed and energizes the first series circuit relay 86 which draws up a contact 86–1 to complete the booster current supply circuit 26. The booster current supply circuit 26 may be traced from the jumper cable 13 to the terminal 47 of the service vehicle battery 51, through the battery 51 to the terminal 46, through a conductor 91 to the now closed contact 86–1, through a conductor 92 to the terminal 54 of the auxiliary battery 53, through the battery 53 to the terminal 55, and through a conductor 93 to a normally open contact 97–1 of a main relay 97. Closure of the remote control switch 25 also completes a circuit 99 through the main relay 97 so that the contact 97–1 is drawn up and connects the booster current supply circuit 26 to the jumper cable 14.

If the jumper cables 13 and 14 are connected properly, that is, connected in the given polarity, to the terminals of the run-down battery 11, the booster current from the batteries 51 and 53 will boost the run-down battery 11 sufficiently to crank the starter motor of the stalled automobile 10 for starting the engine of the stalled automobile.

However, if the jumper cables 13 and 14 are connected in reverse polarity to the terminals of the run-down battery 11, the voltage of the run-down battery is added to the booster voltage so that at least a 12 volt potential and a maximum of a 24 volt potential appears in a polarity responsive circuit 101. The circuit 101 may be traced from the cable 14, through the polarity responsive relay 31 through a conductor 102, through a ballast lamp 103, and through the conductor 91 to the terminal 46.

The ballast lamp 103 has a resistance which varies proportionally with current so that at low current the resistance is low and the resistance increases as the current inceases. The ballast lamp protests the relay 31 by reducing the voltage appearing across the relay 31 so that only approximately an 11 volt potential appears across the relay 31 when 12 volts appears in the circuit 101.

The polarity responsive relay 31 is provided with the normally closed contacts 31–1 and normally open contacts 31–2 which are spring biased so that a minimum voltage of 11 volts is required across the relay 31 for the contacts 31–1 and 31–2 to be actuated.

In this manner, when the cables 13 and 14 are connected in reverse polarity to the terminals of the run-down battery, the booster voltage will be increased by the run-down battery voltage so that the voltage across the relay 31 will be equal to or greater than 11 volts. Thus, the polarity responsive relay 31 will be energized and will actuate the contacts 31–1 and 32–2. The open contact 31–1 precludes completion of the circuit 84, hence precludes closure of the contact 97–1. Thus, the booster current circuit 26 will not be connected to the cable 14 and no damage can be done to the electrical system of the stalled automobile 10.

In addition, upon energization of the polarity responsive relay 31, the normally open contact 31–2 in the alarm circuit 33 is drawn up for completing the alarm circuit 33. The alarm 33 may be traced from the conductor 66, through the buzzer 36 and through the now closed contact 31–2 to the conductor 102. Upon completion of the alarm circuit 33, the buzzer 36 is energized and emits a loud noise or audible signal through a grill 106 provided in the control cabinet 20. The audible signal is sufficiently loud to be heard by the operator 24 when he is at the stalled automobile 10. If, as usual, the signal sounds when the operator 24 has just connected the cables 13 and 14 to the terminals of the run-down battery 11, the operator is apprised of the reverse polarity connection and can immediately reverse the connection. Upon completion of the reversing operation, the operator then closes the remote control switch 25 which connects the booster current supply circuit 26 to the cable 14 so that the booster current is applied to the run-down battery 11 for starting the engine of the stalled vehicle 10.

If the stalled automobile 10 is provided with a 6 volt battery 11, the armature 88 and an armature 111 of the battery voltage selector switch 81 are moved to the 6 volt position for conditioning the first and second parallel relays 69 and 72 for operation.

In the 6 volt position, the armature 111 engages a contact 114 to connect the relay 69 in parallel with the relay 72. Also, the armature 88 engages a contact 112 to complete a series circuit from the parallel connected relays 69 and 72, through the normally closed contact 63–4, through the contact 112 and the armature 88 to the remote control switch 25, and contacts 31–1 and 63–3. Upon closure of the remote control switch 25, the relays 69 and 72 are energized. Energization of the relays 69 and 72 draws up the respective contacts 69–1 and 72–1 to complete the parallel battery circuit 74 so that a 12 volt potential is applied across the booster cables 13 and 14.

It may be understood that because the buzzer 36 is automatically operated for providing the audible signal when the booster cables 13 and 14 are connected in reverse polarity to the terminals of the rundown battery 11, the operator 24 is instantly apprised of the failure of the run-down battery 11 to be boosted. Moreover, because the contact 97–1 is automatically maintained open upon the occurrence of the reverse polarity condition, no damage resulting from the reverse polarity connection can be caused to the electrical system of the stalled automobile 10. Also the open contact 31–1 keeps the booster current supply circuit 26 open as the operator reverses the connection of the booster cables to the terminals of the run-down battery. Moreover, because the signal provides a positive indication of the reverse polarity condition, if the run-down battery 11 is not boosted and the signal does not sound, the operator 24 is quickly apprised of the fact that connections in the electrical system of the stalled automobile 10 are defective or open, hence can promptly correct the defective condition and start the engine of the stalled automobile 10.

It is to be understood that the above-described arrangements are simply illustrative of an application of the principles of the invention. Numerous other arrangements may be devised by those skilled in the art which will embody the principles of the invention and will fall within the spirit and scope thereof.

What is claimed is:

1. In a service vehicle for boosting a run-down battery having a pair of terminals, each of said terminals having a given polarity, the combination of:

a vehicle including a pair of batteries and means for maintaining said pair of batteries in a charged condition;
 means mounted on said vehicle for producing an audible signal;
 control circuit means for connecting said pair of batteries to form a booster current supply circuit;
 cable means for connecting said booster current supply circuit to selected polarity terminals of said run-down battery; and
 polarity protection means responsive to connection of said cable means to terminals opposite to said selected polarity terminals for opening said control circuit to open said connection of said pair of batteries, said polarity protection means being effective to energize said audible signal producing means to indicate said opposite polarity condition.

2. In a service vehicle for boosting a run-down battery of a stalled automobile, said run-down battery having terminals each provided with a given polarity, the combination of:

a vehicle having audible signalling means mounted thereon;
 a pair of batteries carried by said vehicle;
 means for connecting said pair of batteries in a booster current supply circuit, said circuit being provided with output terminals having a polarity corresponding to each said given polarity;
 cable means for connecting said output terminals of said booster current supply circuit to the corresponding polarity terminals of said run-down battery to supply booster current to said run-down battery;
 switch means for completing a circuit from said booster current supply circuit to said cable means; and
 means rendered effective by said cable means connecting output terminals to reverse polarity terminals of said run-down battery for rendering said switch means effective to open said circuit from said booster current supply circuit to said cable means and for energizing said audible signalling means to audibly indicate said connection to said reverse polarity terminals.

3. In a service vehicle for boosting a run-down battery of a stalled automobile, the combination of:

a vehicle having a pair of batteries, and audible signalling means;
 means for connecting said pair of batteries to form a booster current supply circuit;
 a pair of cables for supplying booster current to the terminals of the run-down battery during a boosting operation, said pair of cables being designed for connection in a given polarity to the terminals of the run-down battery;
 switch means for connecting said booster current supply circuit to said pair of cables;
 means controlled by an operator within the stalled automobile for actuating said switch means to apply the booster current to the run-down battery; and
 means rendered effective upon said connection of the pair of cables to the terminals of said run-down battery in a polarity opposite to said given polarity for rendering said switch means ineffective and for energizing said audible signalling means to apprise said operator within said stalled automobile of said opposite polarity connection.

4. In a system for boosting a run-down battery provided with terminals each having a selected polarity, which comprises:

a booster current supply circuit including at least one booster battery having a given voltage for supplying booster current;
 a polarity protection circuit in series with said booster battery and including a relay and a ballast resistor for introducing a variable voltage drop in said polarity protection circuit to limit the voltage appearing across said relay, said relay having a first contact normally biased open and a second contact normally biased closed, said relay being energized for actuating said first and second contacts by a selected voltage of at least said given voltage minus said voltage drop;
 cable means for connecting said polarity protection circuit and said booster current circuit to the terminals of said run-down battery, said cable means normally being effective for connecting said booster current circuit in parallel and with said run-down battery, said cable means being improperly effective to connect said booster battery and said polarity protection circuit in series with run-down battery so that the voltage appearing across said relay exceeds said selected voltage;
 buzzer means energized upon closure of said first normally open contact for indicating said improper connection; and
 circuit means opened by said opening of said second normally closed contact for precluding connection of said cable means to said booster current circuit.

5. In a system for boosting a run-down battery having first and second terminals, the combination of a service vehicle carrying a service vehicle battery and a auxiliary battery;

a control cabinet secured to said service vehicle;

a switch mounted on said control cabinet for selecting a boosting operation and a charging operation;

first relay means connected to said switch, said first relay means having first contacts normally closed during said boosting operation and second contacts normally closed during said charging operation;

second relay means conditioned for operation by said normally closed first contacts, said second relay means including third contacts closed upon operation of said second relay means;

third relay means having a coil and fourth contacts closed in response to energization of said coil;

a booster-current circuit for connecting said service vehicle battery and said auxiliary battery in series, said booster-current circuit including a series connection of said third contacts and said fourth contacts;

cable means connected across said booster-current circuit and provided with connectors for effecting a given polarity connection to said first and second terminals of said run-down battery;

a polarity protection relay connected across said fourth contacts for energization in response to a reverse polarity connection of said connectors of said cable means to said first and second terminals, said polarity protection relay including normally closed fifth contacts opened upon energization of said polarity protection relay;

a control circuit including a remote control switch in series with said normally closed fifth contacts and a parallel connection of said second relay means and said third relay means, said closure of said remote control switch being effective to energize said second and third relay means to close said third and fourth contacts for applying booster current from said service vehicle and auxiliary batteries across said cable means;

said polarity protection relay being energized by said reverse polarity connection for opening said normally closed fifth contacts to open said control circuit and preclude application of said booster current to said cable means; and buzzer means mounted within said control cabinet and energized in response to energization of said polarity protection relay for generating a warning signal indicative of said reverse polarity connection.

6. Apparatus for supplying a boosting voltage to a run-down battery, said apparatus being intended generally for use in conjunction with a service vehicle normally having a storage battery and charging apparatus for maintaining such vehicle battery in a substantially charged state, and with an auxiliary storage battery, comprising:

first battery circuit means for connection to the service vehicle battery;

second battery circuit means for connection to the auxiliary battery;

boost circuit means connected to said first and second battery circuit means to establish a boost voltage supply circuit;

output circuit means connected to said boost voltage supply circuit to supply boost voltage to terminals of a run-down battery in a selected polarity arrangement;

said boost circuit means including switching means selectively operable to a first state wherein the service vehicle battery and the auxiliary battery are electrically connected in parallel as seen at said boost voltage supply circuit and to a second state wherein the service vehicle battery and the auxiliary battery are electrically connected in series as seen at said boost voltage supply circuit;

second switching means operatively connected with said boost circuit means and said output circuit means, said second switching means being selectively actuatable to apply to said output circuit means the boost voltage available at said boost voltage supply circuit;

remote control means operatively connected to said second switching means to cause said selective actuation of said second switching means, said remote control means being selectively operable at the immediate location of a run-down battery to be boosted;

polarity protection means connected to be responsive to the occurrence of connection of said output circuit means to the run-down battery terminals in reversed polarity relative to said selected polarity arrangement, said polarity protection means being connected in circuit with said second switching means and being operable to render said second switching means incapable of applying the boost voltage to said output circuit means in the presence of said polarity reversed condition with respect to a run-down battery.

7. Apparatus as in claim 6, wherein:

said second switching means includes a switching element operable to connect said boost voltage supply circuit to said output circuit means when said second switching means is actuated; and said polarity protection means includes polarity responsive relay means connected across said switching element to be subjected to the voltage thereacross when said switching element is in an open-circuit state, said polarity responsive relay means being energized only in the presence across said switching element of a selected voltage resulting from improper conpolarity to a run-down battery;

said polarity responsive relay means having a relay switching element in circuit with said second switching means, said relay switching element being effective upon operation of said polarity responsive relay means in response to said selected voltage to render said second switching means incapable of applying the boost voltage to said output circuit means.

References Cited

UNITED STATES PATENTS

| 3,105,910 | 10/1963 | Chambers | 320—17 X |
| 3,241,031 | 3/1966 | Raver | 320—59 |
| 3,256,474 | 6/1966 | Englund | 320—16 X |
| 3,258,672 | 6/1966 | Godshalk et al. | 320—25 |

JOHN F. COUCH, *Primary Examiner.*

S. WEINBERG, *Assistant Examiner.*